Oct. 23, 1928.
H. B. ROUSE
1,688,660
CUTTING TOOL
Filed Jan. 13, 1927　　2 Sheets-Sheet 1
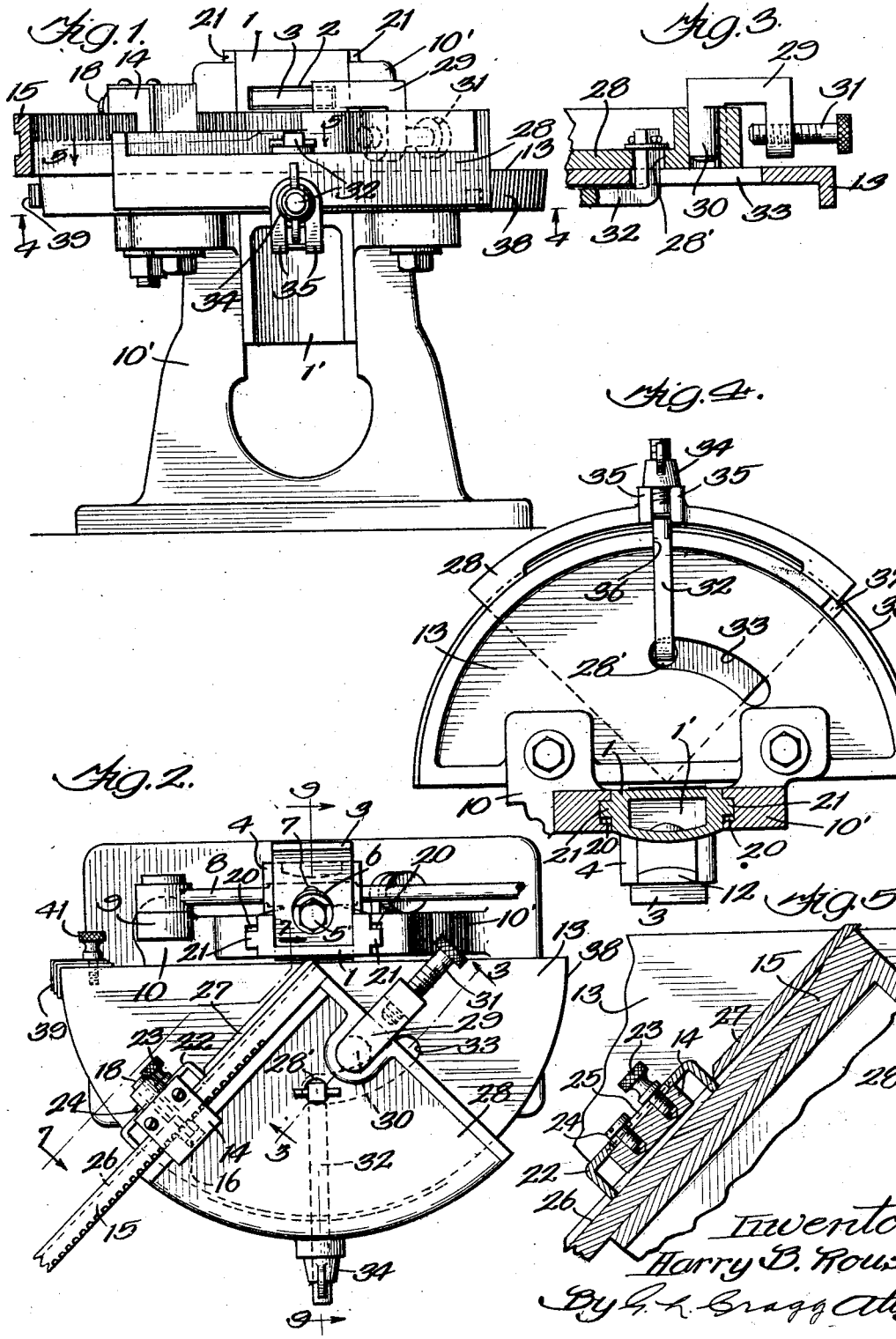

Oct. 23, 1928.
H. B. ROUSE
CUTTING TOOL
Filed Jan. 13, 1927
1,688,660
2 Sheets-Sheet 2
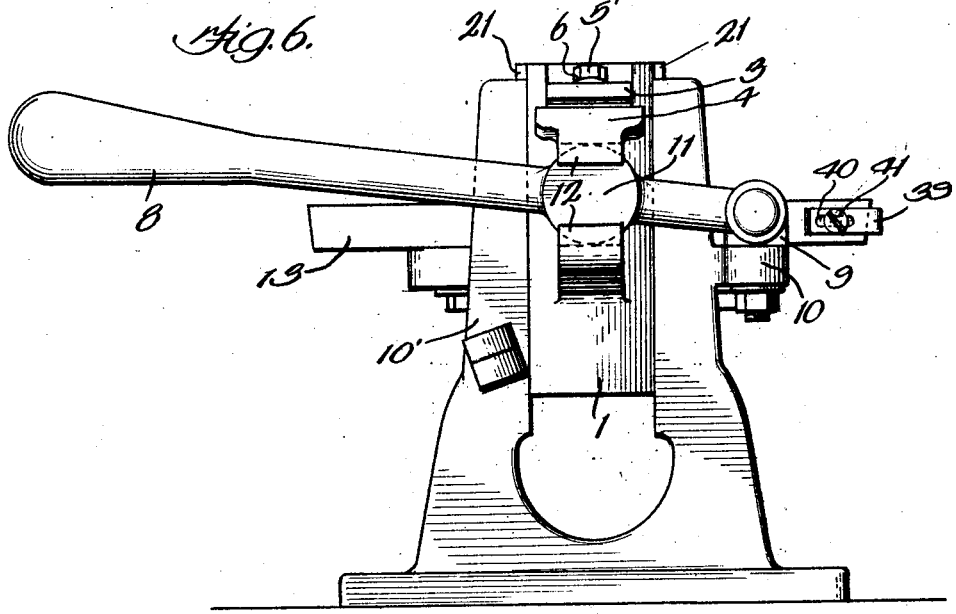
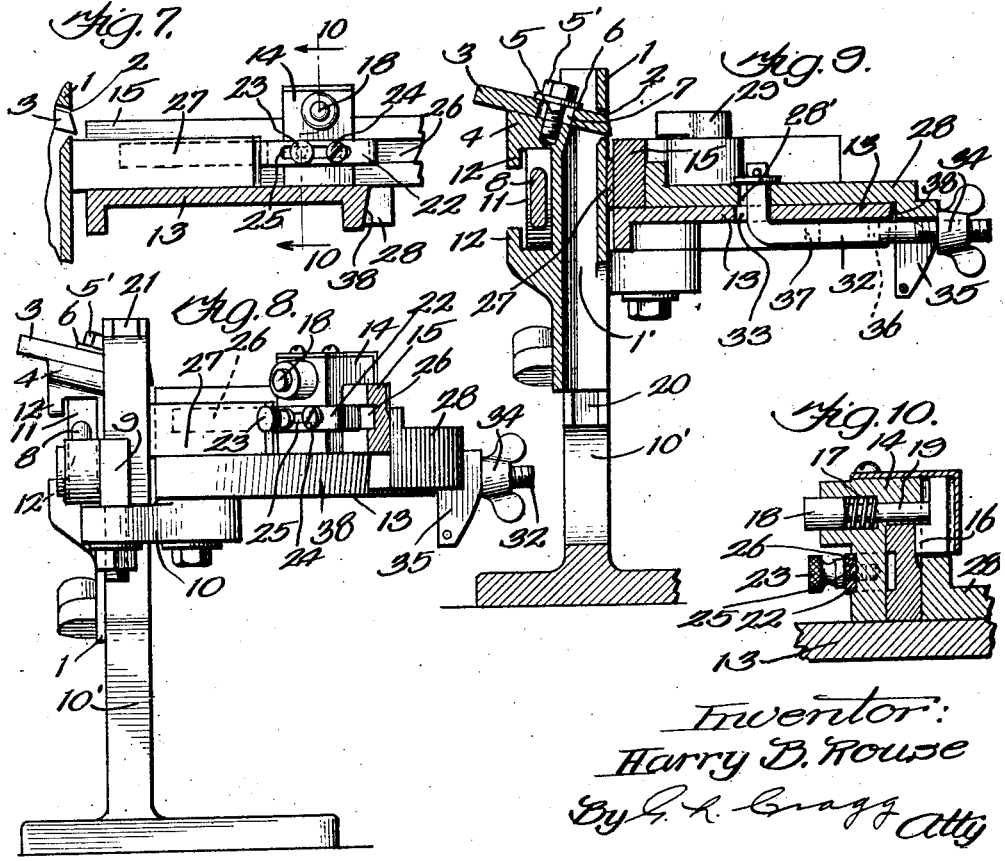
Inventor:
Harry B. Rouse Patented Oct. 23, 1928.

1,688,660

UNITED STATES PATENT OFFICE.

HARRY B. ROUSE, OF CHICAGO, ILLINOIS, ASSIGNOR TO H. B. ROUSE & COMPANY, OF CHICAGO, ILLINOIS, A CORPORATION OF ILLINOIS.

CUTTING TOOL.

Application filed January 13, 1927. Serial No 160,924.

My invention relates to cutting tools and is of particular utility when employed in connection with planes for cutting printers' rules to size, though the invention is not to be limited to any particular use to which it may be put.

The invention has for one of its objects the provision of means whereby the cutting member of the tool may cut shavings from both ends of a strip in the same direction from one side thereof. A plane thus constructed for trimming printers' rules eliminates the presence of burs at the printing edges of the rules trimmed thereby. In carrying out this object of my invention, a member for presenting work to the cutter is employed, this member having two angularly related work engaging sides and two work positioners, one individual to each of said work engaging sides. In the preferred embodiment of this feature of my invention, one of the work positioners is in the form of a clamping member arranged to clamp the work against the associate work engaging side of the work engaging member and the other work positioner is in the form of a gauge stop which is adjustable along the other work engaging side of the work presenting member.

The invention has for another of its objects the provision of means whereby the tool may be readily adjusted to cut the work at various angles. When the machine is employed for cutting printers' rules to size, it is adjustable either for mitering the ends of the rules or for cutting the ends of the rules perpendicularly to their sides. In carrying out this object of my invention, a work table is employed which is preferably horizontally disposed, this work table being preferably formed with a curved track which guides the work presenting member into its different positions upon the table. A clamping bolt is desirably assembled with the table, this bolt passing through a slot formed in the work presenting member and extending in the direction of movement of this member, the bolt having a nut threaded upon its outer end and adapted to press against the work presenting member to hold this member in selected adjustment.

The invention has other features and will be more fully explained in connection with the accompanying drawing in which Fig. 1 is a view in elevation with a guiding rack bar belonging to the machine shown in section; Fig. 2 is a plan view; Fig. 3 is a detailed sectional view on line 3—3 of Fig. 2; Fig. 4 is a sectional view on line 4—4 of Fig. 1; Fig. 5 is a sectional view, on a larger scale, on line 5—5 of Fig. 1; Fig. 6 is another elevation of the machine; Fig. 7 is a sectional view on line 7—7 of Fig. 2; Fig. 8 is another view in elevation; Fig. 9 is a sectional view on line 9—9 of Fig. 2; and Fig. 10 is a sectional view on line 10—10 of Fig. 7.

The stock 1 of the plane is formed with a transverse slot 2 therethrough through which the cutting end of the knife or bit 3 projects beyond the bottom or sole of the stock a distance corresponding to the thickness of the shaving which is to be removed from the work. The plane bit is held in its selected adjustment against the top end 4 of the stock by means of a clamping bolt 5 whose stem is screwed into the block and whose head 5' clamps the washer 6 against the top surface of the bit to clamp the bit against the top surface of the stock end 4. The surface of the stock end 4 which is engaged by the bit is usually inclined so that the knife is presented at the proper angle to the work for cutting shavings therefrom and for directing the shavings through the slot into the hollow portion 1' of the stock. When it is desired to readjust the plane bit, said bolt is loosened, the bolt passing through an elongated slot 7 in the bit which permits longitudinal adjustment of the bit. After the bit has been suitably adjusted, the bolt is tightened to hold it in selected adjustment.

In the embodiment of the invention illustrated, the stock of the plane does not directly carry a handle, the handle 8 for operating the plane stock and the bit carried by the stock being mounted to turn upon a block 9 which, itself, is mounted to turn upon the mounting 10, which is provided upon the guiding frame 10', the axes of movement of the handle upon the block and of the block upon the mounting being perpendicular to each other so that the union or joint between the handle and the mounting is universal. The handle has a disc-like or cylindrical enlargement 11 which is received between the body of the stock and the shoulders 12 so that the stock may readily be moved up and down and may be pressed, during such movement, against the work which is located upon the table 13 that is carried by the mounting 10 and is angular to the stock 1 and its plane of movement. The work is held against the leading portion of the sole of the stock, that which is in advance of the cutting edge of the bit, by means of the block 14 and the rack bar 15, fixed upon the table, said block being held in relation to the rack bar by means of a holding dog 16 which is pressed toward the rack bar by a spring 17 and which may be released from engagement with the rack by means of a thumb piece 18 which is carried upon the rod 19 on which said dog is carried. The spring 17 presses upon the thumb piece in a direction to engage the holding dog with the rack when the teeth upon the dog are in register with teeth upon the rack. When the dog is engaged, said spring is, incidentally, expanded, sufficient power remaining in the spring after the thumb piece is released to engage the holding dog, as stated. The stock of the plane is disposed in an upright groove that is formed in the guide 10', the opposing walls of this groove being recessed as indicated at 20 to receive the stem portions of the T-shaped sides 21 of the stock.

The block 14 desirably carries a U-shaped member 22 which is clamped upon the block by the heads of the screws 23, 24 whose stems are screwed into the block and are passed through an elongated slot 25 formed in said U-shaped member and which permits this member to be adjusted longitudinally of the rack bar 15 with respect to this block. The extreme ends of the sides of said U-shaped member engage the rack to hold the block in exact parallelism with the rack. These ends of the U-shaped member desirably enter a slot 26 formed lengthwise in the rack, the work being operated upon, indicated at 27, being thus prevented from passing beneath the U-shaped member.

In the embodiment of the invention illustrated, the rack 15 constitutes a portion of a quadrant 28 which is the preferred form of work presenting member, the work engaging side of the rack constituting the work engaging side of the quadrant. The other straight work engaging side of the quadrant is provided with a clamping device which is inclusive of a U-shaped bracket 29 having one side 30 journaled in the quadrant, the other side of this bracket carrying a clamping bolt 31 which is threaded in this side, the inner end of the bolt being adapted to engage the work 27 for trimming one end of the work. As illustrated must clearly in Fig. 2, the quadrant is adjusted for mitering the ends of a printer's rule, 27. One end of the rule is trimmed when it is held by the clamping bolt 31. After this end has been suitably trimmed, it is released from the clamp and the trimmed end thereof is positioned against the U-shaped gauge stop 22 which is suitably manipulated to trim the other end of the rule to the desired length. The trimming operations upon both ends of the rule are effected in the same direction from the printing edge of the rule toward the base edge, so that any burs which are formed are upon the base edge of the rule rather than upon the printing edge thereof. This advantage is gained whether the ends of the rule are mitered in the adjustment illustrated in Fig. 2 or are trimmed at right angles to the broad faces of the rule, in which latter operation the quadrant is first adjusted to bring the clamp carrying side of the quadrant perpendicular to the cutting edge to the bit of the plane whereafter the rack is adjusted to be perpendicular to the cutting edge of the plane and the rule is reversed in position to trim the remaining upright ends thereof.

The quadrant is held in either of its adjusted positions by means of the bolt 32 which has one end bent into an upright position to pass through a slot 33 formed in the table and extending in the direction of movement of the quadrant. This angular end of the bolt passes through an opening 28' in the quadrant. A wing nut 34 is screwed upon the other end of the bolt and bears against the ears 35 provided upon the quadrant. When the nut is tightened the quadrant is held in selected position, and intermediate portion of the bolt being received in one or the other grooves 36 and 37 formed in the table. When the quadrant is to be changed from one position to another, the nut 34 is loosened and the bolt is removed from the corresponding groove 36 or 37 to permit the quadrant to be swung to its new position in which the bolt is received in the slot 36 or 37 corresponding to the new position. In the preferred embodiment of the invention, the inner and angular end of the bolt engages the outer arcuate side of the slot 33 when the nut 34 is tightened so that the quadrant and table may be firmly clamped together, Fig. 4. The quadrant is preferably rotatably adjusted upon an axis which is coincident with the line of intersection of the work engaging flat faces of the quadrant. In the preferred embodiment of the invention, the table is formed with a track portion 38 which is circularly curved upon the axis of movement of the quadrant thereby avoiding the necessity of journalling the portion of the quadrant that is adjacent the cutter. By reference, in particular, to Figs. 7 and 8, it will be observed that the engaging surfaces of the track portion 38 and the work presenting member are downwardly and inwardly tapered to prevent the work presenting member from being lifted where it thus engages the track. The invention is not to be limited, however, to this form of interengagement of the parts 28 and 38 for the purpose stated.

The work 27 may be held in exact predetermined positions by means of the angular clips 39 of different thickness which are detachably applicable singly and together to the side of the U-shaped member 22 that is adjacent the work. These clips are formed with elongated slots 40 that may receive the shank of the screws 23 and which permit the clips to be snugly held in position. These clips may be stored upon the table by being clamped thereto by the clamping screw 41.

Changes may be made without departing from the invention.

Having thus described my invention, I claim:

1. The combination with a cutter; of a work holding table formed with a track circularly curved upon a center adjacent the cutter; and a work presenting member having work engaging sides converging toward the cutter and movable upon the table and engaging said track to be guided in its movements, said track and work presenting member having downwardly and inwardly tapering interengaging surfaces serving to prevent the work presenting member from being lifted where it thus engages said track.

2. The combination with a cutter; of a work holding table formed with a curved track; and a work presenting member having work engaging sides converging toward the cutter and movable upon the table and engaging said track to be guided in its movements, said track and work presenting member having interengaging surfaces serving to prevent the work presenting member from being lifted where it thus engages said track.

3. The combination with a cutter; of a work holding table formed with a track circularly curved upon a center adjacent the cutter; a work presenting member having work engaging sides converging toward the cutter and movable upon the table and engaging said track to be guided in its movements; a clamping bolt whose stem has two angular parts, one of these angular parts being assembled with the work presenting member and passing through a slot formed in the table and which slot extends in the direction of movement of the work presenting member; and a clamping nut threaded upon the other angular part of the bolt stem and adapted to press against the peripheral portion of the work presenting member that is between the work engaging sides of such member to hold this member in selected adjustment, said table having a formation engaging said other angular part of the bolt, and, thereby, positioning the work presenting member with respect to the table.

4. The combination with a cutter; of a work holding table formed with a track circularly curved upon a center adjacent the cutter; a work presenting member having work engaging sides converging toward the cutter and movable upon the table and engaging said track to be guided in its movements; a clamping bolt whose stem has two angular parts, one of these angular parts being assembled with the work presenting member and passing through a slot formed in the table and which slot extends in the direction of movement of the work presenting member; and a clamping nut threaded upon the other angular part of the bolt stem and adapted to press against the peripheral portion of the work presenting member that is between the work engaging sides of such member to hold this member in selected adjustment.

In witness whereof, I hereunto subscribe my name.

HARRY B. ROUSE.